US012033352B2

(12) United States Patent
Hebbalaguppe et al.

(10) Patent No.: US 12,033,352 B2
(45) Date of Patent: Jul. 9, 2024

(54) METHODS AND SYSTEMS FOR GENERATING END-TO-END MODEL TO ESTIMATE 3-DIMENSIONAL(3-D) POSE OF OBJECT

(71) Applicant: Tata Consultancy Services Limited, Mumbai (IN)

(72) Inventors: Ramya Sugnana Murthy Hebbalaguppe, Gurgaon (IN); Meghal Dani, Gurgaon (IN); Aaditya Popli, Gurgaon (IN)

(73) Assignee: Tata Consultancy Limited Services, Mumbai (IN)

( * ) Notice: Subject to any disclaimer, the term of this patent is extended or adjusted under 35 U.S.C. 154(b) by 401 days.

(21) Appl. No.: 17/537,805

(22) Filed: Nov. 30, 2021

(65) Prior Publication Data

US 2022/0222852 A1    Jul. 14, 2022

(30) Foreign Application Priority Data

Dec. 3, 2020   (IN) .............................. 202021052798

(51) Int. Cl.
*G06T 7/73* (2017.01)
*G06T 7/55* (2017.01)

(52) U.S. Cl.
CPC .................. *G06T 7/75* (2017.01); *G06T 7/55* (2017.01); *G06T 2207/10024* (2013.01); *G06T 2207/20081* (2013.01); *G06T 2207/20084* (2013.01)

(58) Field of Classification Search
CPC ... G06T 7/75; G06T 7/55; G06T 2207/10024; G06T 2207/20081; G06T 2207/20084;
(Continued)

(56) References Cited

U.S. PATENT DOCUMENTS 10,529,137 B1 *   1/2020   Black ...................... G06T 15/04
10,796,482 B2    10/2020   Ge et al.
(Continued)

OTHER PUBLICATIONS

Cai et al., "Exploiting Spatial-temporal Relationships for 3D Pose Estimation via Graph Convolutional Networks," (2019).
(Continued)

*Primary Examiner* — Michael S Osinski
(74) *Attorney, Agent, or Firm* — Finnegan, Henderson, Farabow, Garrett & Dunner, L.L.P.

(57) ABSTRACT

The present disclosure herein provides methods and systems that solves the technical problems of generating an efficient, accurate and light-weight 3-Dimensional (3-D) pose estimation framework for estimating the 3-D pose of an object present in an image used for the 3-dimensional (3D) model registration using deep learning, by training a composite network model with both shape features and image features of the object. The composite network model includes a graph neural network (GNN) for capturing the shape features of the object and a convolution neural network (CNN) for capturing the image features of the object. The graph neural network (GNN) utilizes the local neighbourhood information through the image features of the object and at the same time maintaining global shape property through the shape features of the object, to estimate the 3-D pose of the object.

15 Claims, 5 Drawing Sheets

(58) Field of Classification Search
CPC ... G06T 2207/30196; G06T 7/73; G06T 7/70; G06T 17/00; G06T 2207/10028; G06T 7/50; G06T 15/04; G06T 19/20; G06T 2207/30244; G06T 15/205; G06T 19/006; G06T 2200/08; G06T 2207/10012; G06T 2207/10016; G06V 10/426; G06V 10/82; G06V 20/64; G06V 40/103; G06V 10/764; G06V 10/454; G06V 20/647; G06V 20/10; G06V 30/19173; G06N 3/045; G06N 3/08; G06N 3/084; G06N 20/00; G06N 3/047; G06N 3/048

See application file for complete search history.

(56) References Cited

U.S. PATENT DOCUMENTS

| | | | | |
|---|---|---|---|---|
| 11,348,279 | B1* | 5/2022 | Akbas | G06V 10/763 |
| 11,625,838 | B1* | 4/2023 | Narapureddy | G06V 10/454 |
| | | | | 382/103 |
| 11,715,258 | B2* | 8/2023 | Kuang | G06N 3/04 |
| | | | | 345/419 |
| 2012/0027292 | A1* | 2/2012 | Kozakaya | G06V 40/166 |
| | | | | 382/154 |
| 2019/0122380 | A1* | 4/2019 | Cao | G06T 7/70 |
| 2019/0278983 | A1* | 9/2019 | Iqbal | G06N 3/084 |
| 2020/0160616 | A1* | 5/2020 | Li | G06V 10/776 |
| 2020/0184668 | A1* | 6/2020 | Rad | G06F 30/00 |
| 2020/0234466 | A1 | 7/2020 | Holzer et al. | |
| 2020/0311855 | A1* | 10/2020 | Tremblay | G06T 1/0014 |
| 2020/0342270 | A1* | 10/2020 | Biswas | G06V 40/103 |
| 2021/0158541 | A1* | 5/2021 | Figueroa-Alvarez | |
| | | | | G06N 3/084 |
| 2022/0044477 | A1* | 2/2022 | Takama | G06T 7/564 |
| 2022/0108468 | A1* | 4/2022 | Nakamura | G06V 40/103 |
| 2022/0108470 | A1* | 4/2022 | Brown | G06T 3/40 |
| 2022/0198750 | A1* | 6/2022 | Zhou | G06T 3/16 |
| 2022/0362945 | A1* | 11/2022 | Tsai | B25J 9/163 |
| 2023/0052169 | A1* | 2/2023 | George | G06T 17/00 |
| 2023/0077856 | A1* | 3/2023 | Irshad | G06T 7/70 |
| | | | | 702/94 |
| 2023/0244835 | A1* | 8/2023 | Guo | G06F 30/27 |
| 2023/0245344 | A1* | 8/2023 | Chang | G06T 7/50 |
| | | | | 382/103 |
| 2023/0298204 | A1* | 9/2023 | Wang | G06T 7/73 |
| | | | | 345/419 |
| 2023/0316552 | A1* | 10/2023 | Shen | G06T 17/00 |
| | | | | 345/419 |
| 2023/0386072 | A1* | 11/2023 | Yao | G06T 7/251 |
| 2024/0065807 | A1* | 2/2024 | Chang | G06T 17/00 |

OTHER PUBLICATIONS

Wang et al., "Dynamic Graph CNN for Learning on Point Clouds," (2019).

* cited by examiner

METHODS AND SYSTEMS FOR GENERATING END-TO-END MODEL TO ESTIMATE 3-DIMENSIONAL(3-D) POSE OF OBJECT

PRIORITY CLAIM

This U.S. patent application claims priority under 35 U.S.C. § 119 to: Indian provisional patent application no. 202021052798, filed on 3 Dec. 2020. The entire contents of the aforementioned application are incorporated herein by reference.

TECHNICAL FIELD

The disclosure herein generally relates to the field of 3-dimensional (3D) model registration, and, more particularly, to methods and systems for generating an end-to-end model to estimate 3-dimensional (3-D) pose of an object used for the 3-dimensional (3D) model registration using deep learning.

BACKGROUND

Augmented Reality (AR) and Virtual Reality (VR) enhances perception of a user through seamless interaction with virtual objects in a real scene or a real image. An accurate 3-D pose estimation of the object present the real image is very important especially in accuracy critical applications such as guided surgeries, robotic applications, industrial engineering, and so on. For example, in the guided surgeries, medical practitioners may benefit from an accurate 3-dimensional (3D) model registration of the object, through the enhanced perception. With the rising need for reliable and real-time pose estimation, the techniques used for the 3-D pose estimation of the object may have to present in resource constrained environments such as smartphones, IoT devices, and head mount devices.

Conventional vision-based techniques for estimating the accurate 3-D pose of the object are limited, complex and computationally heavy to configure in the resource constrained environments. Further, the conventional techniques may estimate the pose only for those objects on which a model has been trained on and thus face challenges in estimating the pose of unseen objects during the training.

SUMMARY

Embodiments of the present disclosure present technological improvements as solutions to one or more of the above-mentioned technical problems recognized by the inventors in conventional systems.

In an aspect, there is provided a processor-implemented method comprising the steps of: receiving (i) an RGB image, (ii) a 3-D model, and (iii) 3-D pose values, of each object of a plurality of objects, from an image repository; generating a skeletal graph of each object of the plurality of objects, from the 3-D model associated with the object, using a transformation algorithm; generating the end-to-end model to estimate the 3-dimensional (3-D) pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises: passing the skeletal graph of each object to the GNN, to generate a shape feature vector of each object; passing the RGB image of each object to the CNN, to generate an object feature vector of each object; concatenating the shape feature vector and the object feature vector of each object, to obtain a shape-image feature vector of each object; passing the shape-image feature vector of each object to the FCN, to generate a predicted pose feature vector of each object, wherein the predicted pose feature vector of each object comprises predicted 3-D pose values corresponding to the object; minimizing a loss function, wherein the loss function defines a loss between the predicted 3-D pose values, and the 3-D pose values of the object; updating weights of the composite network model, based on the loss function; receiving (i) an input RGB image, and (ii) an input 3-D model, of an input object, whose 3-dimensional (3-D) pose to be estimated; generating an input skeletal graph of the input object, from the input 3-D model, using the transformation algorithm; and passing (i) the input RGB image, and (ii) the input skeletal graph of the input object, to the end-to-end model, to estimate an input pose feature vector of the input object, wherein the input pose feature vector comprises input 3-D pose values that defines the 3-dimensional (3-D) pose of the input object.

In another aspect, there is provided a system comprising: a memory storing instructions; one or more input/output (I/O) interfaces; and one or more hardware processors coupled to the memory via the one or more I/O interfaces, wherein the one or more hardware processors are configured by the instructions to: receive (i) an RGB image, (ii) a 3-D model, and (iii) 3-D pose values, of each object of a plurality of objects, from an image repository; generate a skeletal graph of each object of the plurality of objects, from the 3-D model associated with the object, using a transformation algorithm; generate the end-to-end model to estimate the 3-dimensional (3-D) pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises: passing the skeletal graph of each object to the GNN, to generate a shape feature vector of each object; passing the RGB image of each object to the CNN, to generate an object feature vector of each object; concatenating the shape feature vector and the object feature vector of each object, to obtain a shape-image feature vector of each object; passing the shape-image feature vector of each object to the FCN, to generate a predicted pose feature vector of each object, wherein the predicted pose feature vector of each object comprises predicted 3-D pose values corresponding to the object; minimizing a loss function, wherein the loss function defines a loss between the predicted 3-D pose values, and the 3-D pose values of the object; and updating weights of the composite network model, based on the loss function; receive (i) an input RGB image, and (ii) an input 3-D model, of an input object, whose 3-dimensional (3-D) pose to be estimated; generate an input skeletal graph of the input object, from the input 3-D model, using the transformation algorithm; and pass (i) the input RGB image, and (ii) the input skeletal graph of the input object, to the end-to-end model, to estimate an input pose feature vector of the input object, wherein the input pose feature vector comprises input 3-D pose values that defines the 3-dimensional (3-D) pose of the input object.

In yet another aspect, there is provided a computer program product comprising a non-transitory computer readable medium having a computer readable program embodied therein, wherein the computer readable program, when executed on a computing device, causes the computing device to: receive (i) an RGB image, (ii) a 3-D model, and (iii) 3-D pose values, of each object of a plurality of objects, from an image repository; generate a skeletal graph of each object of the plurality of objects, from the 3-D model associated with the object, using a transformation algorithm; generate the end-to-end model to estimate the 3-dimensional (3-D) pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises: passing the skeletal graph of each object to the GNN, to generate a shape feature vector of each object; passing the RGB image of each object to the CNN, to generate an object feature vector of each object; concatenating the shape feature vector and the object feature vector of each object, to obtain a shape-image feature vector of each object; passing the shape-image feature vector of each object to the FCN, to generate a predicted pose feature vector of each object, wherein the predicted pose feature vector of each object comprises predicted 3-D pose values corresponding to the object; minimizing a loss function, wherein the loss function defines a loss between the predicted 3-D pose values, and the 3-D pose values of the object; and updating weights of the composite network model, based on the loss function; receive (i) an input RGB image, and (ii) an input 3-D model, of an input object, whose 3-dimensional (3-D) pose to be estimated; generate an input skeletal graph of the input object, from the input 3-D model, using the transformation algorithm; and pass (i) the input RGB image, and (ii) the input skeletal graph of the input object, to the end-to-end model, to estimate an input pose feature vector of the input object, wherein the input pose feature vector comprises input 3-D pose values that defines the 3-dimensional (3-D) pose of the input object.

In an embodiment, generating the input skeletal graph of the input object, from the input 3-D model, using the transformation algorithm, comprises: voxelizing the input 3-D model of the input object to obtain an input skeleton model of the input object, using a voxelization function of the transformation algorithm, wherein the input skeleton model of the input object comprises one or more one-dimensional input skeleton voxels associated with the input object; and transforming the input skeleton model of the input object to generate the input skeletal graph of the input object, using a skeleton-to-graph transformation function of the transformation algorithm.

In an embodiment, generating the skeletal graph of each object of the plurality of objects, from the 3-D model associated with the object, using the transformation algorithm, comprises: voxelizing the 3-D model associated with the object to obtain a skeleton model of the object, using a voxelization function of the transformation algorithm, wherein the skeleton model of the object comprises one or more one-dimensional skeleton voxels associated with the object; and transforming the skeleton model of the object to generate the skeletal graph of the corresponding object, using a skeleton-to-graph transformation function of the transformation algorithm.

In an embodiment, the graph neural network (GNN) works as a message passing network, and comprises 3 edge convolutional blocks, a sum pooling layer, and a graph encoder, each edge convolutional block comprises a edge convolution layer followed by three neural blocks, wherein each neural block includes a fully connected layer, a batch normalization layer, and a Rectified Linear Unit (ReLU) layer.

In an embodiment, the convolution neural network (CNN) comprises a set of convolution layers, an average pooling layer and a CNN fully connected layer.

In an embodiment, the fully connected network (FCN) comprises three neural blocks, wherein each neural block comprises a fully connected layer, a batch normalization layer, and a Rectified Linear Unit (ReLU) layer.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
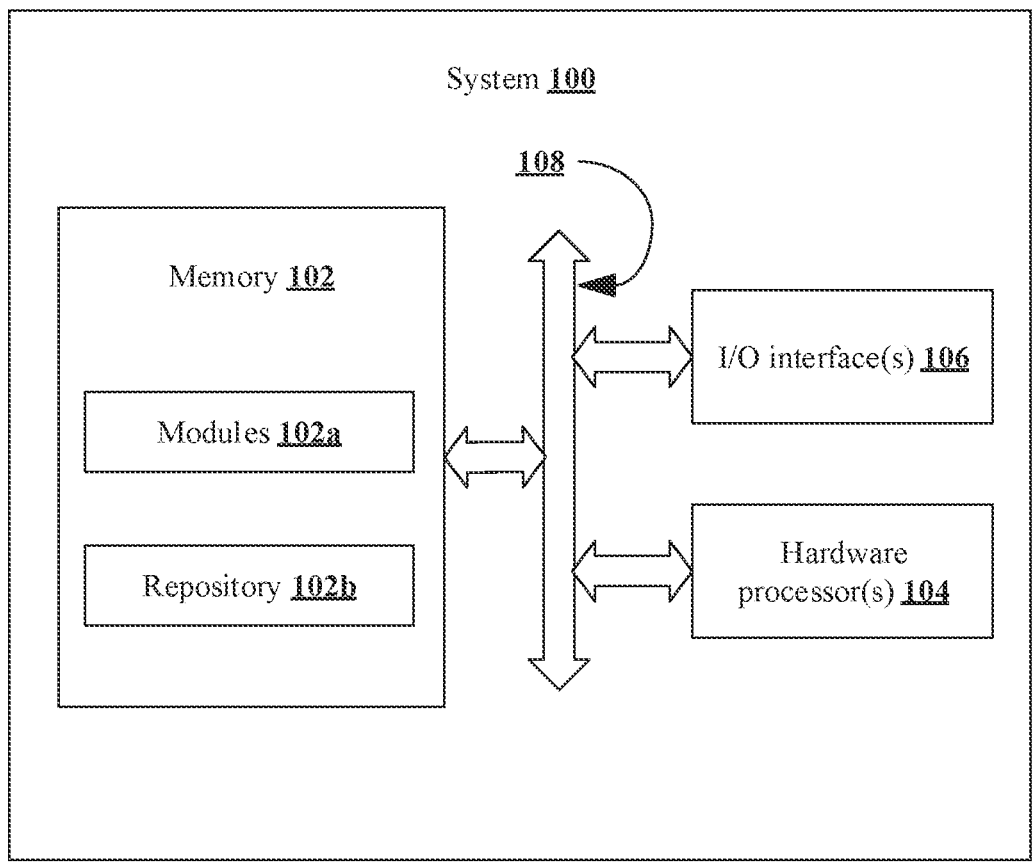
FIG. 1 is an exemplary block diagram of a system for generating the end-to-end model to estimate the 3-dimensional (3-D) pose of the object present in the image, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

The present disclosure herein provides methods and systems that solves the technical problems of generating an efficient, accurate and light-weight 3-Dimensional (3-D) pose estimation framework for estimating the 3-D pose of an object in an image, by training a composite network model with both shape features and image features of the object. The composite network model includes a graph neural network (GNN) for capturing the shape features of the object and a convolution neural network (CNN) for capturing the image features of the object. The graph neural network (GNN) utilizes the local neighbourhood information through the image features of the object and at the same time maintaining global shape property through the shape features of the object, to estimate the 3-D pose of the object.

Referring now to the drawings, and more particularly to FIG. 1 through FIG. 3B, where similar reference characters denote corresponding features consistently throughout the figures, there are shown preferred embodiments and these embodiments are described in the context of the following exemplary systems and/or methods.

FIG. 1 is an exemplary block diagram of a system 100 for generating the end-to-end model to estimate the 3-dimensional (3-D) pose of the object present in the image, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a. Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2A:
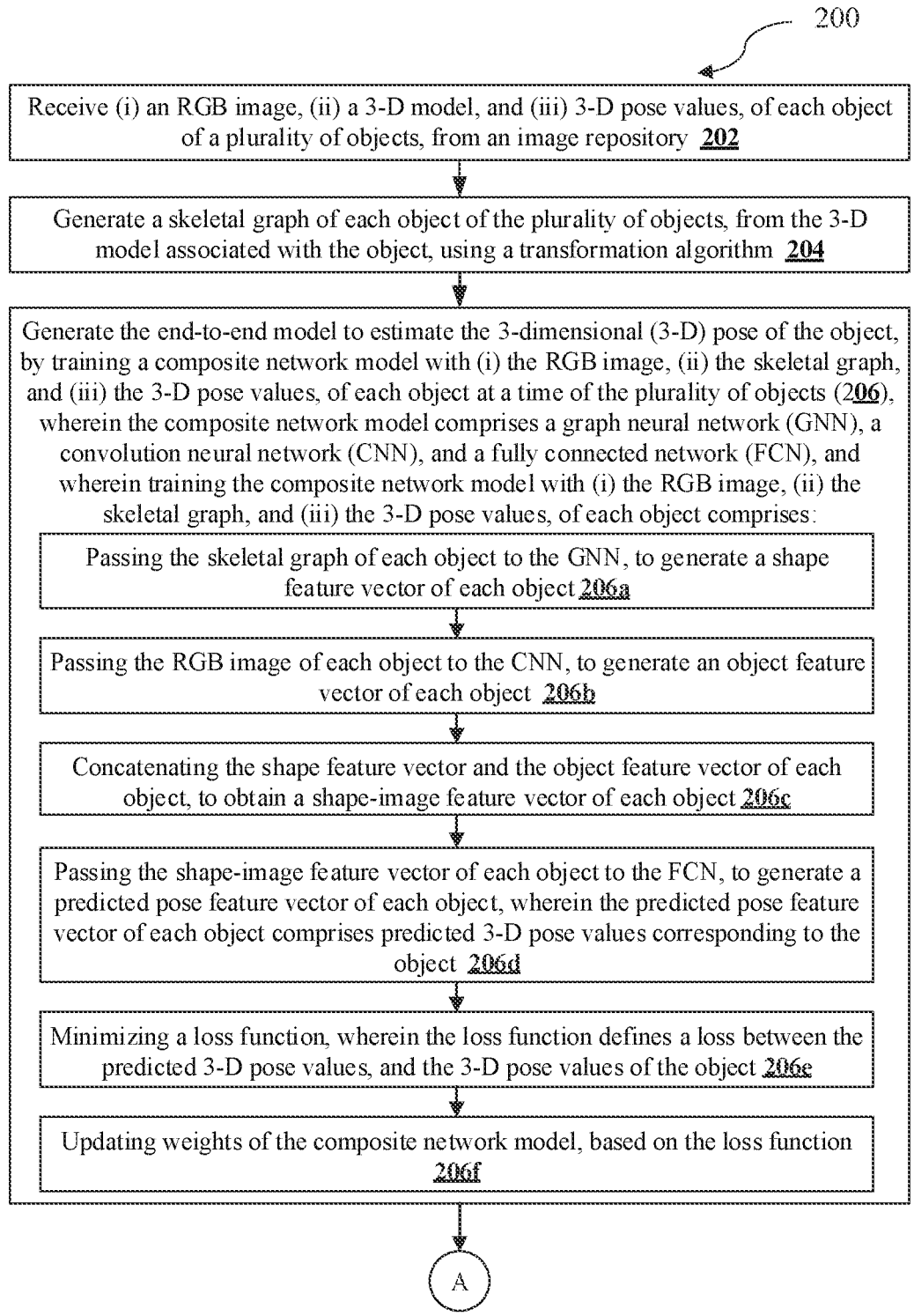
FIG. 2A and FIG. 2B illustrate exemplary flow diagrams of a processor-implemented method for generating the end-to-end model to estimate the 3-dimensional (3-D) pose of the object present in the image, in accordance with some embodiments of the present disclosure.
Figure 2B:
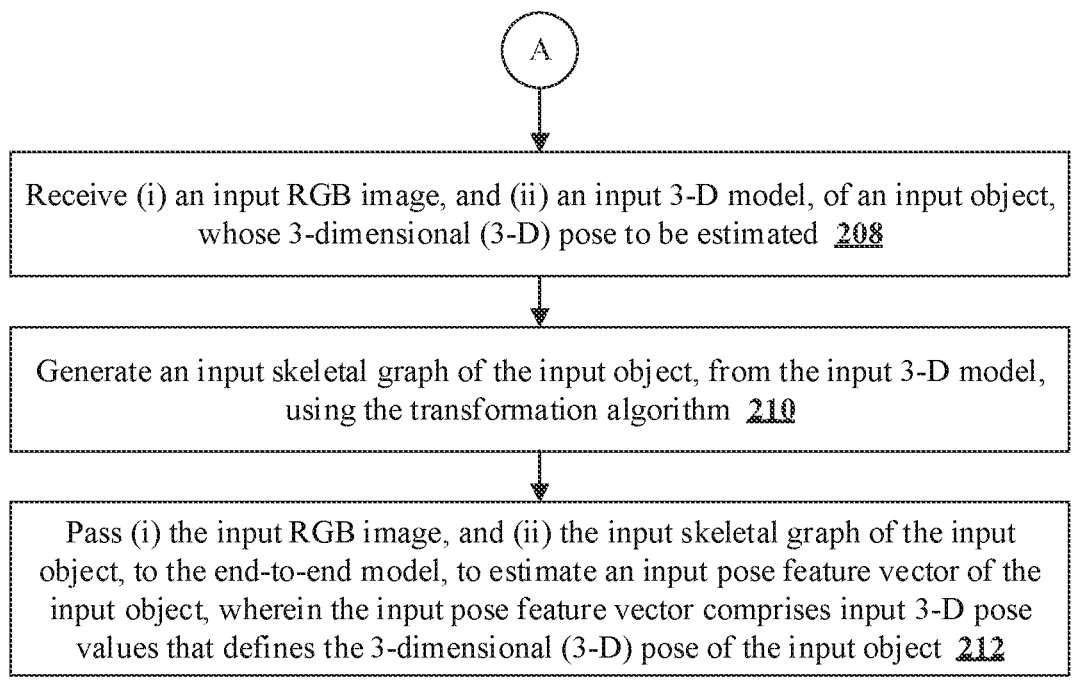

Referring to FIG. 2, components and functionalities of the system 100 are described in accordance with an example embodiment of the present disclosure. For example, FIG. 2A and FIG. 2B illustrate exemplary flow diagrams of a processor-implemented method 200 for generating the end-to-end model to estimate the 3-dimensional (3-D) pose of the object present in the image, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive (i) an red-green-blue (RGB) image, (ii) a 3-D model, and (iii) 3-D pose values, of each object of a plurality of objects. In an embodiment, the object may be a rigid body object for which the end-to-end model has to be generated to estimate the 3-D pose. The rigid body object is one of a list of rigid body objects including but are not limited to cars, aeroplanes, cycles, chairs, human organs and so on. In an embodiment, each object of the plurality of objects unique in terms of either a structure or a shape. In an embodiment, the 3-D model of each object may be a Computer aided design (CAD) model of the object, obtained through a CAD tool. The 3-D pose values of the object define the 3-D pose of the object and include an azimuth angle $a_z$, an elevation angle $e_l$, and an in-plane rotation angle $i_p$. In an embodiment, the RGB image, the 3-D model, and the 3-D pose values, of each object of the plurality of objects may be stored in the repository 102b of the system 100.

At step 204 of the method 200, the one or more hardware processors 104 of the system 100 are configured to generate a skeletal graph of each object of the plurality of objects received at step 202 of the method 200, from the 3-D model associated with the object, using a transformation algorithm. To generate the skeletal graph of each object, first the 3-D model associated with the object to obtain a skeleton model of the object and then the skeleton model of the object is transformed to generate the skeletal graph of the corresponding object. The skeleton model of the object includes one or more one-dimensional skeleton voxels associated with the object.

The 3-D model associated with the object is voxelized to obtain the skeleton model of the object, using a voxelization function of the transformation algorithm. In an embodiment, the voxelization function may be a thinning algorithm used to convert the 3-D model of the object to obtain the skeleton model of the object. Meshes present in the 3-D model of the object are vowelized to obtain a corresponding 3-D binary image. Entire 3-D cube of the obtained 3-D binary image is divided into foreground voxels (1s) and background voxels (0s). The thinning algorithm make use of Prairie-Fire analogy wherein boundaries of the 3-D binary image are set on fire and the skeleton is the loci where the fire fronts meet and quench each other. The obtained skeleton model includes only the one-dimensional skeleton voxels associated with the object.

Next, the skeleton model of each object is transformed to obtain the skeletal graph of the corresponding object, using a skeleton-to-graph transformation function of the transformation algorithm. In an embodiment, the skeleton-to-graph transformation function may be a MATLAB based skeleton-to-graph transformation function. The skeleton-to-graph transformation function takes the skeleton model of the object along with a branch threshold value as inputs for generating the skeletal graph for the corresponding object.

Initially the entire volume or cube present in the associated skeleton model is padded with zeroes keeping in mind the cases where the skeleton voxels may lie on the boundary of the volume or cube. Then, all the foreground skeleton voxels (voxels with values 1) present in the cube are identified. Then, one or more neighbourhood voxels for each identified foreground skeleton voxels are identified along with associated index values. Each foreground skeleton voxel having more than 2 neighbourhood voxels is marked as a branch node of the skeletal graph. Also, each foreground skeleton voxel having exactly one neighbourhood voxel is marked as an end node of the skeletal graph. Each foreground skeleton voxel having exactly 2 neighbourhood voxels is ignored.

Further, all the branch nodes and the end nodes are traversed to obtain the completed skeletal graph. If all the branch nodes and the end nodes are not traversed, then features of the corresponding nodes are determined and marked as end nodes. All the branch nodes are further traversed to obtain the completed skeletal graph. If any branch node is not traversed, then the one or more neighbourhood voxels for the corresponding branch node is determined. If the length of a link from the determined one or more neighbourhood voxels is greater than the branch threshold value, then such branch nodes are part of the skeletal graph. The branch threshold value helps to remove the short branches and keep only the branch nodes and the end nodes that are relevant to form the skeletal graph of the corresponding object. Each node present in the generated skeletal graph include 3-D coordinates (x, y, z) of the corresponding point present in the object. The generated skeletal graph captures the latent semantic and compositional information of the object.

At step 206 of the method 200, the one or more hardware processors 104 of the system 100 are configured to generate the end-to-end model to estimate the 3-dimensional (3-D) pose of the object, by training a composite network model, with (i) the RGB image, (ii) the skeletal graph, and (iii) the 3-D pose values, of each object at a time of the plurality of objects received at step 202 of the method 200.

Figure 3A:
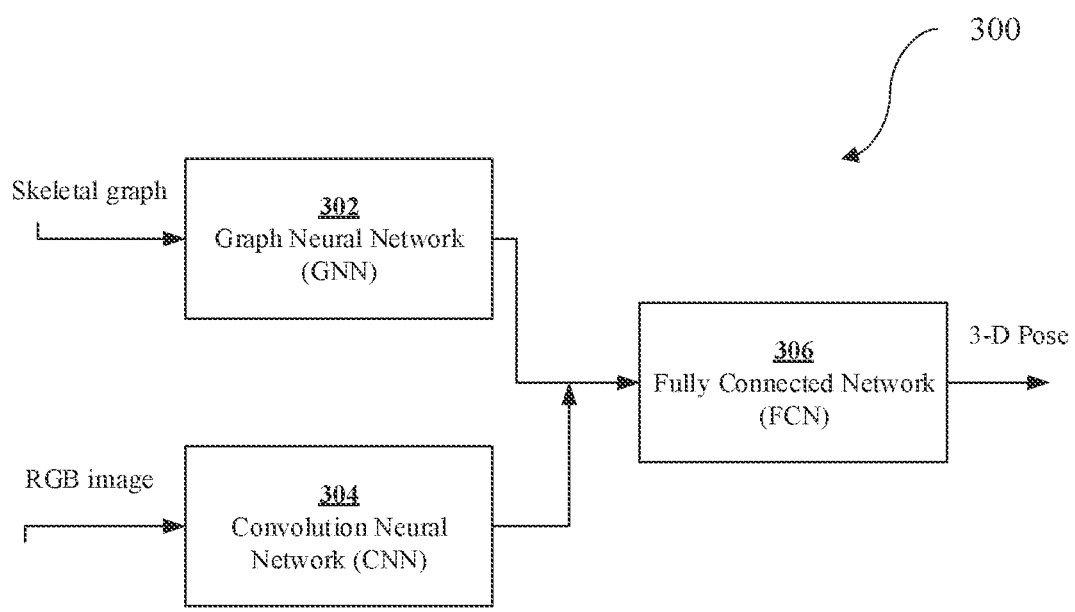
FIG. 3A is an exemplary high-level architecture of a composite network model for generating the end-to-end model to estimate the 3-dimensional (3-D) pose of the object present in the image, in accordance with some embodiments of the present disclosure.
Figure 3B:
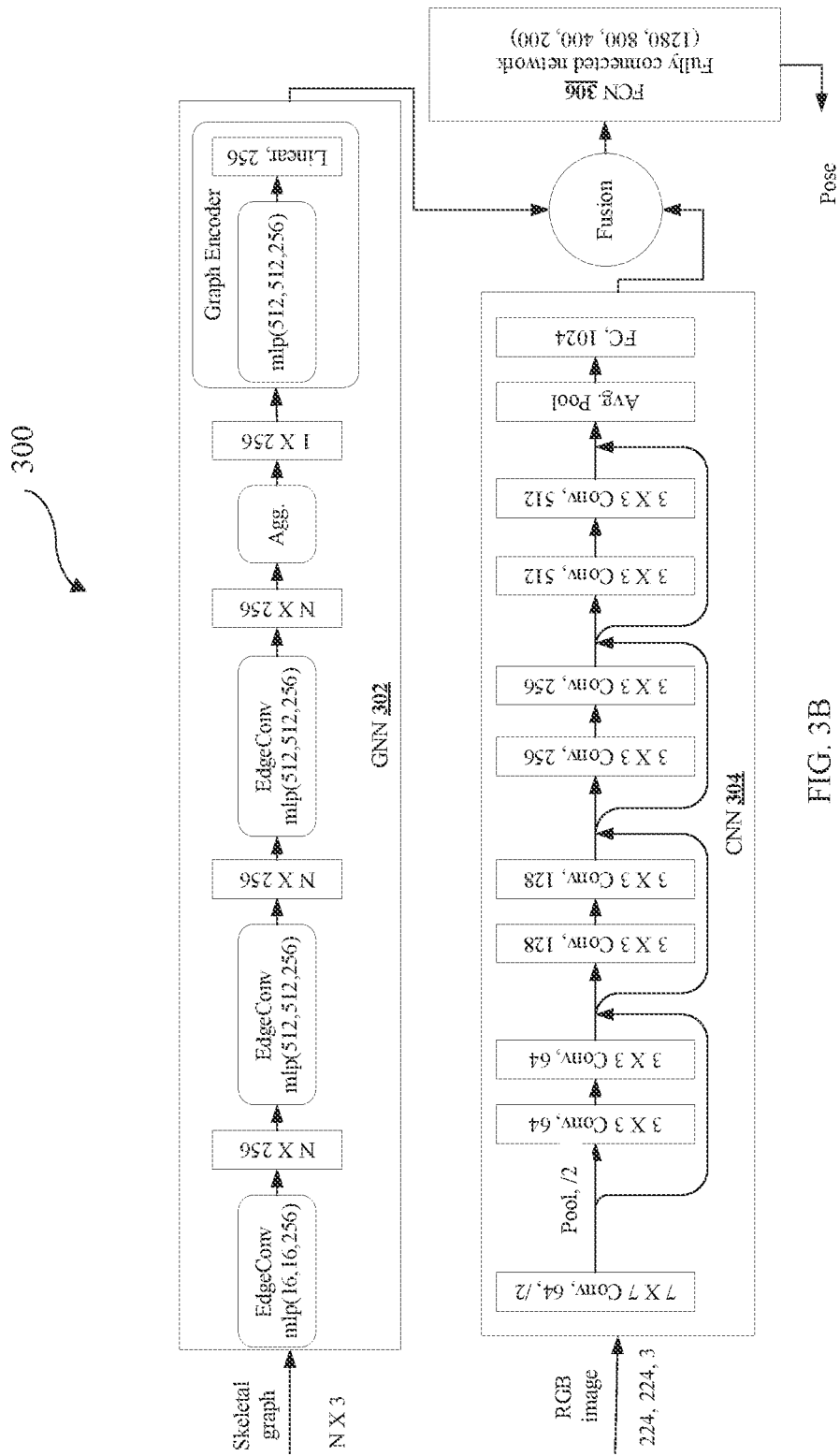
FIG. 3B is an exemplary detailed architecture of the composite network model for generating the end-to-end model to estimate the 3-dimensional (3-D) pose of the object present in the image, in accordance with some embodiments of the present disclosure.

FIG. 3A is an exemplary high-level architecture of a composite network model 300 for generating the end-to-end model to estimate the 3-dimensional (3-D) pose of the object present in the image, in accordance with some embodiments of the present disclosure. FIG. 3B is an exemplary detailed architecture of the composite network model 300 for generating the end-to-end model to estimate the 3-dimensional (3-D) pose of the object present in the image, in accordance with some embodiments of the present disclosure. As shown in FIG. 3A and FIG. 3B, the composite network model 300 includes a graph neural network (GNN) 302, a convolution neural network (CNN) 304, and a fully connected network (FCN) 306.

The graph neural network (GNN) 302 works as a message passing network, and includes 3 edge convolutional blocks, a sum pooling layer, and a graph encoder. Each edge convolution block of the 3 edge convolutional blocks, includes an edge convolution layer followed by three neural blocks. Each neural block of the three neural blocks present in each edge convolution block includes a fully connected layer, a batch normalization layer, and a Rectified Linear Unit (ReLU) layer. The three neural blocks present in the GNN 302 are used to learn complex non-linear functions. The graph encoder includes 4 neural blocks. Each neural block of the first three neural blocks out of the 4 neural blocks present in the graph encoder, includes a fully connected layer, a batch normalization layer, and a Rectified Linear Unit (ReLU) layer. The last neural block of the graph encoder includes one fully connected layer.

The detailed architecture layers of the GNN 302 is mentioned below:
  (i) Edge convolution block 1:
    Message passing layer (edge convolution layer)
    Fully connected layer (input: 6, output: 16)
    Batch normalization layer (1D)
    ReLU layer
    Fully connected layer (input: 16, output: 16)
    Batch normalization layer (1D)
    ReLU layer
    Fully connected layer (input: 16, output: 256)
    Batch normalization layer (1D)

ReLU layer
(ii) Edge convolution block 2:
   Message passing layer (edge convolution layer)
   Fully connected layer (input: 512, output: 512)
   Batch normalization layer (1D)
   ReLU layer
   Fully connected layer (input: 512, output: 512)
   Batch normalization layer (1D)
   ReLU layer
   Fully connected layer (input: 512, output: 256)
   Batch normalization layer (1D)
   ReLU layer
(iii) Edge convolution block 3:
   Message passing layer (edge convolution layer)
   Fully connected layer (input: 512, output: 512)
   Batch normalization layer (1D)
   ReLU layer
   Fully connected layer (input: 512, output: 512)
   Batch normalization layer (1D)
   ReLU layer
   Fully connected layer (input: 512, output: 256)
   Batch normalization layer (1D)
   ReLU layer
(iv) Sum pooling layer
(v) Graph encoder neural block 1:
   Fully connected layer (input: 512, output: 512)
   Batch normalization layer (1D)
   ReLU layer
(vi) Graph encoder neural block 2:
   Fully connected layer (input: 512, output: 512)
   Batch normalization layer (1D)
   ReLU layer
(vii) Graph encoder neural block 3:
   Fully connected layer (input: 512, output: 256)
   Batch normalization layer (1D)
   ReLU layer
(viii) Graph encoder neural block 4:
   Fully connected layer (input: 256, output: 256)

The convolution neural network (CNN) 304 includes 9 convolution layers, an average pooling layer and a CNN fully connected layer. In an embodiment, the 9 convolution layers present in the CNN 304 may be obtained from a ResNet-18 architecture.

The fully connected network (FCN) 306 includes three neural blocks. Each neural block of the FCN 306 includes a fully connected layer, a batch normalization layer, and a Rectified Linear Unit (ReLU) layer.

The composite network model 300 takes the RGB image of the object and the associated skeletal graph of the object as input variables, and the associated 3-D pose values of the object as target variables, while training (learning). Training the composite network model with (i) the RGB image, (ii) the skeletal graph, and (iii) the 3-D pose values, of each object, is further explained through steps 206a-206f.

At step 206a, the skeletal graph of each object is passed to the GNN 302 of the composite network model 300, to generate a shape feature vector of each object. The generated shape feature vector includes shape information of the associated object. At each edge convolution layer of the GNN 302, an implicit dynamic unweighted sub graph is generated for each node present in the associated skeletal graph. More specifically, for each node i present in the associated skeletal graph, a predefined number of nearest neighbour nodes in the feature space are calculated. The predefined number of nearest neighbour nodes are used to update the feature vector for the corresponding node at the corresponding edge convolution layer. In an embodiment, the predefined number of nearest neighbour nodes may be 4.

For each neighbour node j, a difference feature vector is calculated by taking the difference between the feature vectors of corresponding node i and the corresponding neighbour node j, i.e. $d_{ij}=x_j-x_i$. A final vector $d_i$ is obtained by taking element-wise maximum over all $d_{ij}$. The final vector $d_i$ is concatenated with the feature vectors of corresponding node i (current feature vector) to obtain the updated feature vector for the corresponding node. The updated feature vector for the corresponding node at each edge convolution layer is passed to the three neural blocks (linear layers) to obtain a final edge feature vector of size 256. The updated feature vector for the corresponding node at each edge convolution layer is obtained according an edge convolution operation defined as:

$$x_i'=\text{AGGREGATE}_{max}\{h_\Theta(x_i\|x_j-x_i)|j\in N(i)\}$$

where $h_\Theta$ is a multi-layer perceptron. $x_i$ refers to the current feature vector, $x_j$ refers to the feature vector of the associated neighbour node, and $x_i'$ refers to the updated feature vector for the $i_{th}$ node. N(i) refers to the set of nearest neighbour nodes in the feature space, and $\|$ represents the concatenation of the feature vectors.

The edge convolution operation is repeated multiple times to learn the structure of the skeletal graph i.e. the shape of the object The edge convolution operation is used to incorporate neighbourhood knowledge into the embedding vector for each node in order to learn a better shape representation of the object. Initially, the feature vector for each node only consists of 3 coordinates (x, y, z) and hence only contains local information. However, as a result of multiple convolution operations, the feature vector for each node in the graph encodes the information about a larger neighbourhood due to repeated message passing between neighbouring nodes. Finally, the node-level feature vectors for all the nodes present in the associated skeletal graph are summed up to obtain a graph-level feature vector for the associated skeletal graph, using an embedding operation defined as:

$$g_i=\Sigma x_j|j\in V_i$$

where $g_i$ refers to the graph embedding of the associated skeletal graph i, and $V_i$ refers to the node set present in the associated skeletal graph i.

The obtained graph-level feature vector for the associated skeletal graph is passed through the graph encoder of the GNN 302, to generate the shape feature vector of the object. The generated shape feature vector of the object is of size 256.

At step 206b, the RGB image of each object is passed to the CNN 304 of the composite network model 300, to generate an object feature vector of each object. Initial convolution layers of the CNN 304 extract high level features moving towards the low-level features. Such that, the CNN 304 starts from learning edges of the model in RGB image to shape and geometry and additional salient features with respect to the object present in the Image. The generated object feature vector of the associated object is of size 1024.

The CNN 304 creates the features with respect to each of the objects and is then able to distinguish between them during the testing process. For example, if the object is the aero-plane, the CNN 304 recognize the shape and the geometry features such as the boundary edges, the wings, tail features, and the associated position, and the additional salient features such as color and windows, lights presents in the aero-plane i.e., moving from high level to very minute level features.

At step 206c, the shape feature vector of the object generated by the GNN 302 at step 206a and the associated object feature vector of the object generated by the CNN 304 at step 206b, are concatenated (fused) to obtain a shape-image feature vector of the associated object. The obtained shape-image feature vector of the associated object is a one-dimensional (1-D) vector of size 1280. The obtained shape-image feature vector of the associated object includes both the shape features and image features of the object, which are used to encode complementary information about the object and this help in better pose estimation.

At step 206d, the shape-image feature vector of the associated object is passed through the FCN 306 of the composite network model 300 for generating a predicted pose feature vector of each object. The predicted pose feature vector of each object includes predicted 3-D pose values corresponding to the object. The size of the of predicted pose feature vector is 200. The layers present in the FCN 306 are used to learn rich features while progressively reducing the size of the vector to retain as much information as possible while reducing the memory requirement. The shape-image feature vector of the size 1280 is reduced by the FCN 306 and the size of the predicted pose feature vector is 200.

The actual 3-D pose values of the object are classified with respect to the RGB image in the reference frame in terms of the azimuth angle $a_z$, the elevation angle $e_t$, and in-plane rotation angle $i_p$. For this, each angle $\Phi \in \{a_z, e_t, i_p\}$ is divided into 'b' bin labels such that the model maps 'l' labels $\in \{(0, b-1)\}$ and $\delta$ offsets $\in [-1,1]$. The FCN 306 combines the outputs from pose regression and pose classification i.e., offsets and probabilities respectively, to get the predicted pose feature vector i.e., the predicted 3-D pose values corresponding to the object. The predicted 3-D pose values are mapped with the associated actual 3-D pose values of the object and learns the weights during the training.

At step 206e, a loss function of the FCN 306 is minimized, wherein the loss function defines a loss between the predicted 3-D pose values, and the 3-D pose values of the object. The loss function of the FCN 306 in other words termed as a final loss which is defined as an addition of classification probabilities and regression offsets. A standard cross entropy loss $\mathcal{L}_{CE}$ and a smooth L1 loss (Huber loss) $\mathcal{L}_{L1}$ for the classification and the regression are utilized, respectively. The final loss $\mathcal{L}_{CE-Reg}$ is expressed as:

$$\mathcal{L}_{CE-Reg} = \sum_{i=1}^{N} \sum_{\phi} \mathcal{L}_{CE}(l_{i,\phi}, prob_{\phi}(img_i, graph_i)) + \mathcal{L}_{L1}(\delta_{i,\phi})$$

where $img_i$ refers to the RGB image of the associated object, and $graph_i$ refers to the skeletal graph of the associated object. $prob_\phi(img_i, graph_i)$ refers to the predicted probabilities parameterized by $\phi$ with respect to the RGB image of the object and the skeletal graph of the object, and $reg_{\phi, l_{i,\phi}}(img_i, graph_i)$ refers to the regression predicted offset.

At step 206f, the weights of the FCN 306 are updated based on the loss function for next iteration. More specifically, if the difference between the predicted 3-D pose values, and the actual e 3-D pose values of the object, is less than a predefined threshold, the weights of the composite network model 300 are updated and back-propagated for the next iteration, else the present weights are retained for the next iteration. Like this, the composite network model 300 is trained until the plurality of objects with the corresponding (i) RGB image, (ii) skeletal graph, and (iii) 3-D pose values, are completed to obtain the end-to-end model.

Model parameters of the composite network model 300 are initialized using pre-trained ImageNet weights, and are back-propagated based on the value of the loss function of the FCN 306 to update the weights using Adam optimizer with an initial learning rate of $10^{-4}$ which is decreased by a factor of 10 at the $100^{th}$, $175^{th}$ epochs, for a total of 200 epochs with a batch size of 64.

The end-to-end model obtained after training the composite network model 300 may be validated using a validation dataset having (i) the RGB image, (ii) the skeletal graph, and (iii) the 3-D pose values, of each validated object of the plurality of validated objects for checking the accuracy of the end-to-end model before actual testing (inference).

The generated end-to-end model is used to estimate the 3-D pose of an input object on which the generated end-to-end model is trained during the training. For example, if the plurality of objects received at step 202 are associated with the aero-planes, then the generated end-to-end model is used to estimate the 3-D pose of an input object being the aero-plane. Similarly, if the plurality of objects received at step 202 are associated with the chairs, then the generated end-to-end model is used to estimate the 3-D pose of an input object being the chair, and so on. Estimating the 3-D pose of an input object using the generated end-to-end model is further explained through steps 208-212 of the method 200.

At step 208 of the method 200, the one or more hardware processors 104 of the system 100 are configured to receive an input RGB image and an input 3-D model, of the input object, whose 3-dimensional (3-D) pose to be estimated by the generated end-to-end model. In an embodiment, the input object may be the rigid body object as specified at step 202 of the method 200 and on which the composite network model 300 is trained at step 206 of the method 200 to generate the end-to-end model. The rigid body object is one of the list of rigid body objects including but are not limited to cars, aero-planes, cycles, chairs, human organs and so on. Further, the input 3-D model of the input object may be the Computer aided design (CAD) model of the input object, obtained through the CAD tool.

At step 210 of the method 200, the one or more hardware processors 104 of the system 100 are configured to generate an input skeletal graph of the input object, from the input 3-D model, using the transformation algorithm as explained in step 204 of the method 200. The input 3-D model of the input object is voxelized to obtain an input skeleton model of the input object, using the voxelization function of the transformation algorithm. The input skeleton model of the input object includes one or more one-dimensional input skeleton voxels associated with the input object. Then, the input skeleton model of the input object is transformed to generate the input skeletal graph of the input object, using the skeleton-to-graph transformation function of the transformation algorithm.

At step 212 of the method 200, the one or more hardware processors 104 of the system 100 are configured to pass the input RGB image received at step 208 of the method, and the input skeletal graph of the input object generated at step 210 of the method 200, to the end-to-end model generated at step 206 of the method 200, to estimate an input pose feature vector of the input object. The input pose feature vector includes input 3-D pose values that defines the 3-dimensional (3-D) pose of the input object. The end-to-end model generates the input shape feature vector from the input skeletal graph of the input object (through the GNN 302) and generates the input object feature vector from the input RGB image of the input object (through the CNN 304). Then, the input shape feature vector and the input object feature vector are concatenated to obtain the input shape-image feature vector of the input object. Further the end-to-end model takes the input shape-image feature vector and estimates the input pose feature vector of the input object (through the FCN 306). The input pose feature vector of the input object includes input 3-D pose values comprising the azimuth angle $a_z$, the elevation angle $e_l$, and the in-plane rotation angle $i_p$.

The estimated 3-D pose of the object is used to generate the accurate 3-dimensional (3-D) model registration of the object. The 3-dimensional (3-D) model registration of the object is used for accuracy critical applications such as guided surgeries, robotic applications, industrial engineering, and so on. For example, in the guided surgeries, medical practitioners may benefit from the accurate 3-dimensional (3-D) model registration of the object, through the enhanced perception.

In accordance with the present disclosure, the methods and systems of the present disclosure generates the end-to-end model which is used to accurately and efficiently estimate the pose of the object present in the image using the shape features and well as RGB features of the object. The end-to-end model captures only the important shape information of the object in the form of skeletal graph with only few nodes instead of a large of points as in a point cloud. Moreover, the skeletal graph provides concise and easily computable information as compared to point clouds and multi-views. Hence the end-to-end model of the present disclosure is compact and light-weight. Because of the compact and light-weight features, the end-to-end model may be easily configured in resource constrained environments such as smartphones, IoT devices, head mount devices, and so on. The compact end-to-end model of the present disclosure may be used to facilitate on-device inference in applications such as in Augmented Reality and Robotics for 3-D virtual model overlay. With the desirable properties such as invariance to rotation, translation, and scaling, makes the skeletal graphs optimum choice for representing 3-D objects.

Since the GNN 302 of the end-to-end model, employs unsupervised graph representation to represent 3-D shapes for generic rigid body objects, making the disclosed pose estimation framework category-agnostic. Further, using the 3-D shapes promotes accurate registration of the object using the estimated pose information. Further, the estimated 3-D pose information may be used to overlay digital content such as annotations and 3-D models for an immersive user experience. Since the GNN 302 of the end-to-end model captures the shape information of the object, the end-to-end model of the present disclosure accurately estimate the pose of the unseen objects during the training.

Example Scenario

Training Dataset: For training the composite network model 300 to generate the end-to-end model for estimating the pose of the object, the dataset, Pascal3D+ mentioned in Xiang et al. 2014 (Y Xiang, R Mottaghi, and S Savarese. 2014. Beyond pascal: A benchmark for 3d object detection in the wild. In IEEE WACV. IEEE, 75-82.) are used, which comprises of images, annotations, and CAD (3-D) models for 12 rigid body object categories including aero-plane, cycle, car, etc.

To compare the performance of the end-to-end model of the present disclosure, the PoseFromShape mentioned in Xiao et al. 2019 (Yang Xiao, Xuchong Qiu, Pierre-Alain Langlois, Mathieu Aubry, and Renaud Marlet. 2019. Pose from Shape: Deep Pose Estimation for Arbitrary 3D Objects. arXiv preprint arXiv:1906.05105 (2019) as a baseline. The PoseFromShape baseline generates PointClouds, random Multiviews and feeds them to a ResNet-18 model [He et al. 2016] (Kaiming He, Xiangyu Zhang, Shaoqing Ren, and Jian Sun. 2016. Deep residual learning for image recognition. In Proceedings of the IEEE CVPR. 770-778.) for the pose estimation. The performance results are mentioned in terms of accuracy denoted by $Accuracy_{\pi/6}$ where $\pi/6$ is the threshold value. The prediction is considered correct if the error of the estimated pose is within the mentioned threshold. The present disclosure is first evaluated on seen categories, i.e, objects present in the training dataset. The testing protocol mentioned in Xiao et al. 2019 is considered. Table 1 shows the performance results of the present disclosure over the base line PoseFromShape [Xiao et al. 2019], in terms of (i) inference time and (ii) number of model parameters. From Table 1, the inference time and the number of model parameters of the model are significantly less as compared to the base line. Hence the end-to-end model of the present disclosure is light-weight and compact and so the end-to-end model can be deployed in resource constrained environments such as smartphones, IoT devices, head mount devices, and so on.

TABLE 1

| Model | inference time | Number of model parameters |
|---|---|---|
| PoseFromShape [Xiao et al. 2019] | 0.26 Sec | 23,009,664 |
| Present disclosure | 0.06 Sec | 15,049,192 |

TABLE 2

| Model | Category agnostic | Accuracy$_{\pi/6}$ |
|---|---|---|
| [Tulsiani and Malik 2015] (S Tulsiani and J Malik. 2015. Viewpoints and keypoints. In Proceedings of the IEEE CVPR. 1510-1519. | No | 76% |
| [Su et al. 2015] (Hao Su, Charles R Qi, Yangyan Li, and Leonidas J Guibas. 2015. Render for cnn: Viewpoint estimation in images using cnns trained with rendered 3d model views.) | No | 82% |
| [Kundu et al. 2018] (Jogendra Nath Kundu, Aditya Ganeshan, Rahul MV, and Aditya Prakash. 2018. iSPANet: Iterative Semantic Pose Alignment Network. In ACM-MM. 967-975.) | No | 74% |
| [Grabner et al. 2018] (A Grabner, P M Roth, and V Lepetit. 2018. 3d pose estimation and 3d model retrieval for objects in the wild, In Proceedings of the IEEE CVPR. 3022-3031.) | Yes | 81.33% |
| PoseFromShape [Xiao et al, 2019] | Yes | 82.66% |
| Present disclosure | Yes | 84.43% |

Table 2 shows the performance of the present disclosure in terms of accuracy over 5 listed baselines where some baselines are category agnostic and some baselines are not category agnostic. The present disclosure achieves the accuracy of 84.43% which is high compared to all 5 baselines.

The experimental results mentioned in Table 1 and Table 2 also supports that the end-to-end model of the present disclosure is compact, light-weight as well as accurate in estimating the 3-D pose of the object present in the image.

The embodiments of present disclosure herein address unresolved problem of the end-to-end 3-Dimensional (3-D) pose estimation framework which is efficient, accurate and light-weight, for estimating the 3-D pose of the object in an image, by training the composite network model with both shape features and image features of the object. The composite network model includes a graph neural network (GNN) for capturing the shape features of the object and a convolution neural network (CNN) for capturing the image features of the object. The graph neural network (GNN) utilizes the local neighbourhood information through the image features of the object and at the same time maintaining global shape property through the shape features of the object, to estimate the 3-D pose of the object.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method comprising the steps of:

receiving, via one or more hardware processors, (i) an RGB image, (ii) a three-dimensional (3-D) model, and (iii) 3-D pose values, of each object of a plurality of objects, from an image repository;

generating, via the one or more hardware processors, a skeletal graph of each object of the plurality of objects, from the 3-D model associated with the object, using a transformation algorithm;

generating, via the one or more hardware processors, an end-to-end model to estimate the 3-D pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises:

passing the skeletal graph of each object to the GNN, to generate a shape feature vector of each object;

passing the RGB image of each object to the CNN, to generate an object feature vector of each object;

concatenating the shape feature vector and the object feature vector of each object, to obtain a shape-image feature vector of each object;

passing the shape-image feature vector of each object to the FCN, to generate a predicted pose feature vector of each object, wherein the predicted pose feature vector of each object comprises predicted 3-D pose values corresponding to the object;

minimizing a loss function, wherein the loss function defines a loss between the predicted 3-D pose values, and the 3-D pose values of the object; and updating weights of the composite network model, based on the loss function.

2. The method of claim 1, further comprising:

receiving, via the one or more hardware processors, (i) an input RGB image, and (ii) an input 3-D model, of an input object, whose 3-D pose is to be estimated;

generating, via the one or more hardware processors, an input skeletal graph of the input object, from the input 3-D model, using the transformation algorithm; and passing, via the one or more hardware processors, (i) the input RGB image, and (ii) the input skeletal graph of the input object, to the end-to-end model, to estimate an input pose feature vector of the input object, wherein the input pose feature vector comprises input 3-D pose values that defines the 3-D pose of the input object.

3. The method of claim 2, wherein generating the input skeletal graph of the input object, from the input 3-D model, using the transformation algorithm, comprises:

voxelizing the input 3-D model of the input object to obtain an input skeleton model of the input object, using a voxelization function of the transformation algorithm, wherein the input skeleton model of the input object comprises one or more one-dimensional input skeleton voxels associated with the input object; and transforming the input skeleton model of the input object to generate the input skeletal graph of the input object, using a skeleton-to-graph transformation function of the transformation algorithm.

4. The method of claim 1, wherein generating the skeletal graph of each object of the plurality of objects, from the 3-D model associated with the object, using the transformation algorithm, comprises:

voxelizing the 3-D model associated with the object to obtain a skeleton model of the object, using a voxelization function of the transformation algorithm, wherein the skeleton model of the object comprises one or more one-dimensional skeleton voxels associated with the object; and transforming the skeleton model of the object to generate the skeletal graph of the corresponding object, using a skeleton-to-graph transformation function of the transformation algorithm.

5. The method of claim 1, wherein the graph neural network (GNN) works as a message passing network, and comprises 3 edge convolutional blocks, a sum pooling layer, and a graph encoder, each edge convolutional block comprises a edge convolution layer followed by three neural blocks, wherein each neural block comprises a fully connected layer, a batch normalization layer, and a Rectified Linear Unit (ReLU) layer.

6. The method of claim 1, wherein the convolution neural network (CNN) comprises a set of convolution layers, an average pooling layer and a CNN fully connected layer.

7. The method of claim 1, wherein the fully connected network (FCN) comprises three neural blocks, wherein each neural block comprises a fully connected layer, a batch normalization layer, and a Rectified Linear Unit (ReLU) layer.

8. A system comprising:
a memory storing instructions;
one or more Input/Output (I/O) interfaces; and
one or more hardware processors coupled to the memory via the one or more I/O interfaces, wherein the one or more hardware processors are configured by the instructions to:

receive (i) an RGB image, (ii) a three-dimensional (3-D) model, and (iii) 3-D pose values, of each object of a plurality of objects, from an image repository;

generate a skeletal graph of each object of the plurality of objects, from the 3-D model associated with the object, using a transformation algorithm;

generate an end-to-end model to estimate the 3-D pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises:

passing the skeletal graph of each object to the GNN, to generate a shape feature vector of each object;

passing the RGB image of each object to the CNN, to generate an object feature vector of each object;

concatenating the shape feature vector and the object feature vector of each object, to obtain a shape-image feature vector of each object;

passing the shape-image feature vector of each object to the FCN, to generate a predicted pose feature vector of each object, wherein the predicted pose feature vector of each object comprises predicted 3-D pose values corresponding to the object;

minimizing a loss function, wherein the loss function defines a loss between the predicted 3-D pose values, and the 3-D pose values of the object; and updating weights of the composite network model, based on the loss function.

9. The system of claim 8, wherein the one or more hardware processors are further configured to:

receive (i) an input RGB image, and (ii) an input 3-D model, of an input object, whose 3-D pose is to be estimated;

generate an input skeletal graph of the input object, from the input 3-D model, using the transformation algorithm; and pass (i) the input RGB image, and (ii) the input skeletal graph of the input object, to the end-to-end model, to estimate an input pose feature vector of the input object, wherein the input pose feature vector comprises input 3-D pose values that defines the 3-D pose of the input object.

10. The system of claim 9, wherein the one or more hardware processors are configured to generate the input skeletal graph of the input object, from the input 3-D model, using the transformation algorithm, by:

voxelizing the input 3-D model of the input object to obtain an input skeleton model of the input object, using a voxelization function of the transformation algorithm, wherein the input skeleton model of the input object comprises one or more one-dimensional input skeleton voxels associated with the input object; and transforming the input skeleton model of the input object to generate the input skeletal graph of the input object, using a skeleton-to-graph transformation function of the transformation algorithm.

11. The system of claim 8, wherein the one or more hardware processors are configured to generate the skeletal graph of each object of the plurality of objects, from the 3-D model associated with the object, using the transformation algorithm, by:
  voxelizing the 3-D model associated with the object to obtain a skeleton model of the object, using a voxelization function of the transformation algorithm, wherein the skeleton model of the object comprises one or more one-dimensional skeleton voxels associated with the object; and
  transforming the skeleton model of the object to generate the skeletal graph of the corresponding object, using a skeleton-to-graph transformation function of the transformation algorithm.

12. The system of claim 8, wherein the graph neural network (GNN) works as a message passing network, and comprises 3 edge convolutional blocks, a sum pooling layer, and a graph encoder, each edge convolutional block comprises a edge convolution layer followed by three neural blocks, wherein each neural block comprises a fully connected layer, a batch normalization layer, and a Rectified Linear Unit (ReLU) layer.

13. The system of claim 8, wherein the convolution neural network (CNN) comprises a set of convolution layers, an average pooling layer and a CNN fully connected layer.

14. The system of claim 8, wherein the fully connected network (FCN) comprises three neural blocks, wherein each neural block comprises a fully connected layer, a batch normalization layer, and a Rectified Linear Unit (ReLU) layer.

15. A computer program product comprising a non-transitory computer readable medium having a computer readable program embodied therein, wherein the computer readable program, when executed on a computing device, causes the computing device to:
  receive (i) an RGB image, (ii) a three-dimensional (3-D) model, and (iii) 3-D pose values, of each object of a plurality of objects, from an image repository;
  generate a skeletal graph of each object of the plurality of objects, from the 3-D model associated with the object, using a transformation algorithm;
  generate an end-to-end model to estimate the 3-D pose of the object, by training a composite network model with (i) the RGB image, (ii) the skeletal graph, and (iii) the 3-D pose values, of each object at a time of the plurality of objects, wherein the composite network model comprises a graph neural network (GNN), a convolution neural network (CNN), and a fully connected network (FCN), and wherein training the composite network model with (i) the RGB image, (ii) the skeletal graph, and (iii) the 3-D pose values, of each object comprises:
    passing the skeletal graph of each object to the GNN, to generate a shape feature vector of each object;
    passing the RGB image of each object to the CNN, to generate an object feature vector of each object;
    concatenating the shape feature vector and the object feature vector of each object, to obtain a shape-image feature vector of each object;
    passing the shape-image feature vector of each object to the FCN, to generate a predicted pose feature vector of each object, wherein the predicted pose feature vector of each object comprises predicted 3-D pose values corresponding to the object;
    minimizing a loss function, wherein the loss function defines a loss between the predicted 3-D pose values, and the 3-D pose values of the object; and
    updating weights of the composite network model, based on the loss function;
  receive (i) an input RGB image, and (ii) an input 3-D model, of an input object, whose 3D pose to be estimated;
  generate an input skeletal graph of the input object, from the input 3-D model, using the transformation algorithm; and
  pass (i) the input RGB image, and (ii) the input skeletal graph of the input object, to the end-to-end model, to estimate an input pose feature vector of the input object, wherein the input pose feature vector comprises input 3-D pose values that defines the 3-D pose of the input object.

\* \* \* \* \*